United States Patent [19]

Baize et al.

[11] Patent Number: 4,800,484
[45] Date of Patent: Jan. 24, 1989

[54] COMPUTING INSTALLATION WITH AUTOMATIC TERMINAL SWITCHING AND A TERMINAL ADAPTED TO SUCH SWITCHING

[75] Inventors: Dominique Baize, Lagnieu; Maurice Cleánd, Pont de Cheruy; Serge Minard, Lagnieu, all of France

[73] Assignee: Electricite de France, Paris, France

[21] Appl. No.: 623,214

[22] Filed: Jun. 21, 1984

[30] Foreign Application Priority Data

Jun. 21, 1983 [FR] France ............................. 83 10247

[51] Int. Cl.⁴ ............................................. G06F 13/14
[52] U.S. Cl. ........................................................ 364/200
[58] Field of Search ... 364/200 MS File, 900 MS File

[56] References Cited

U.S. PATENT DOCUMENTS

| | | | |
|---|---|---|---|
| 3,214,739 | 10/1965 | Gountanis et al. | 364/200 |
| 3,253,262 | 5/1966 | Wilenitz et al. | 364/200 |
| 3,934,230 | 1/1976 | Salle et al. | 364/200 |
| 4,004,277 | 1/1977 | Gavril | 364/200 |
| 4,096,572 | 6/1978 | Namimoto | 364/200 |
| 4,442,502 | 4/1984 | Friend et al. | 364/900 |
| 4,485,436 | 11/1984 | Austruy et al. | 364/200 |
| 4,495,569 | 1/1985 | Kagawa | 364/200 |
| 4,623,883 | 11/1986 | Konen | 371/9 |

*Primary Examiner*—Archie E. Williams, Jr.
*Assistant Examiner*—Emily Y. Chan
*Attorney, Agent, or Firm*—Larson and Taylor

[57] ABSTRACT

The computing installation comprises a plurality of digital computers and at least a terminal unit, for instance a printer, suitable for use in cooperation with any one of the computers. Each computer may deliver a request for access to the terminal. In response, a connection is established between the computer which issued the request and the terminal if the latter is free. Simultaneously, access to the terminal unit by the other computers is prevented for a predetermined time period or for the duration of the connection between the terminal unit and the computer which first issued an access request.

2 Claims, 6 Drawing Sheets

COMPUTING INSTALLATION WITH AUTOMATIC TERMINAL SWITCHING AND A TERMINAL ADAPTED TO SUCH SWITCHING

BACKGROUND OF THE INVENTION

The present invention relates to computing installations likely to incorporate several computers operating independently intended to be associated with input or output terminal units (such as card readers, disk units, printers, modems, . . . ). In present installations, each independent computer is provided with terminal units which are assigned to it, even when each of these terminal units was able to be used possibly through an adapter, with any one of the computers. Devices are however known for mechanically switching one terminal unit to one or other of the computers so as to fulfil the requirements for a particular computing program. This mechanical switching has switching defects inherent in the technology and, in addition, is very ill suited to the random nature of the requirement of connecting different computers to a given terminal unit.

SUMMARY OF THE INVENTION

It is an object of the invention to provide a substantial economy in installations comprising several computers which, during their operation, must temporarily cooperate with terminal units of the same nature for several computers. To this end, the invention provides more especially an installation comprising several digital computers and a terminal unit capable of cooperating with any one of the computers, characterized in that it comprises means for causing, in response to an access request to the terminal unit emitted by one of the computers, the connection to be established between the computer and the terminal unit, if this latter is free, and for forbidding access to the terminal unit by other computers during a given time or during the occupancy time.

The invention may be put into effect in numerous ways, whenever there is a number of computers greater than the number of terminal units of the same type. Several terminal units of different types may each be equipped so as to be able to be used alternately by the different computers. The means for establishing the connection will obviously depend on the nature of the terminal unit. In some cases, for example that of an input terminal unit such as a reader, it will be sufficient to establish the connection, the computer subsequently providing the necessary commands. In other cases, for example that of a printer, additional commands will be required for separating the data coming from the different computers. This separation may more especially be achieved by page jumping or by entry of appropriate reference indications.

The invention will be better understood from reading the following description of installations which form particular embodiments thereof given by way of non limiting examples.

DESCRIPTION OF THE PREFERRED EMBODIMENT

Figure 1:
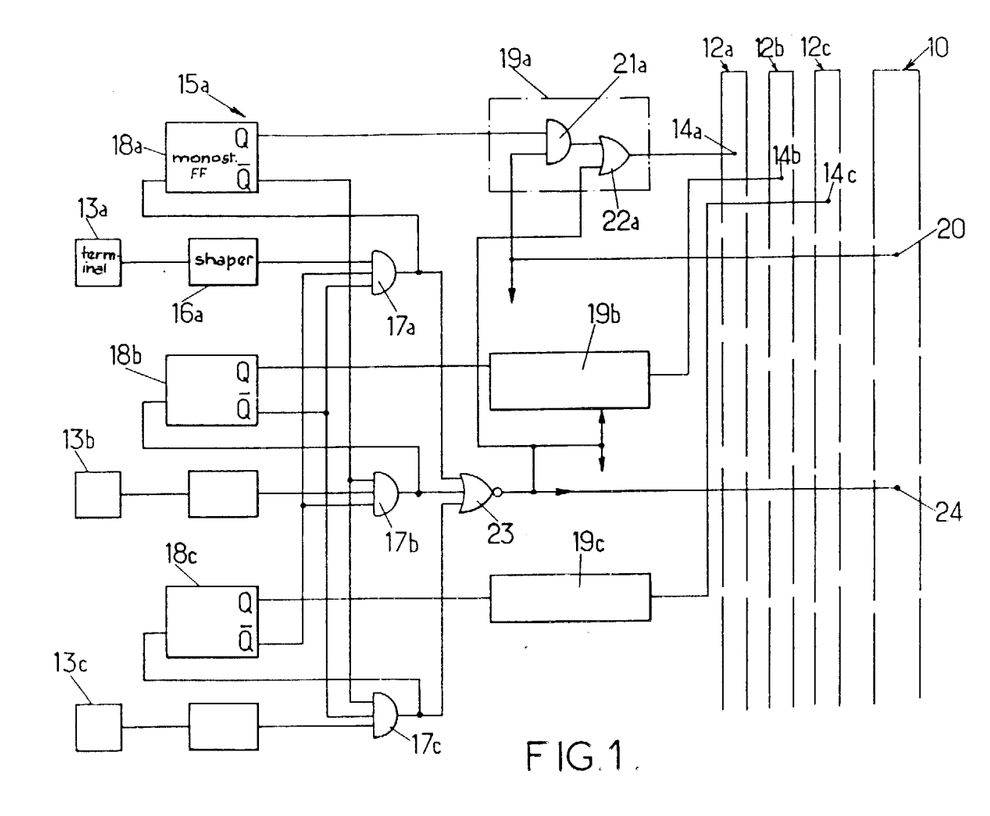
FIG. 1 is a block drawing diagram showing the switching means provided in the installation for allowing the access by three computers belonging to the installation to a common input terminal unit, formed by a card reader.

Referring to FIG. 1, there is shown switching means intended to be connected, on the one hand, to a connector 10 equipping the card reader and on the other hand to connectors 12a, 12b and 12c each equipping one of the computers (not shown).

Operation of the computers and that of the card reader remain unchanged. When a computer must have access to the card reader, a signal is emitted on a particular pin of the associated connector (these pins being shown at 13a, 13b and 13c). It will be assumed that the internal logic of the computer is such that the access request signal is formed by the corresponding pin 13 passing to logic level 1 FIG. 1, the level coming back to zero once the card has been read. It should be noted in this connection that the switching means may be adapted to the case where one computer operates with positive logic, another with negative logic, as long as adapters are added.

The means shown in FIG. 1 are provided for allowing access by a computer to the card reader when the reader is free, then for preventing access by the other computers while the first one dialogues with the card reader.

For that, the means shown use the fact that the dialogue is only established on reception by the computer of a "ready" signal from the reader. The means inhibit reception of the signal by the other computers once an access request has been received from the first computer. This result is attained, by inserting, between the access request terminal 13 (emission of the signal frequently called "pick command") and terminal 14 receiving the "ready" signal on the corresponding connector, a circuit which is the same for each of the computers. Only the circuit 15a associated with the first computer will be described. It comprises, from pin 13a, a shaping circuit 16a which will be generally a Schmitt trigger which drives an AND gate 17a with as many inputs as there are computers. The output of this gate 17a is applied to a memory, formed in FIG. 1 by a monostable FF 18a whose holding time is compatible with the reading time: this holding time will be for example four seconds. Instead of a monostable FF, a circuit could be used which changes state on reception of the signal from gate 17a and remains in this state until the card reader is freed. The other two inputs of the AND gate 17a are connected to the $\overline{Q}$ outputs of the monostable FFs 18a and 18c controlled by the access request signals on the other two computers. Similarly, the Q output of monostable 18a is applied to the AND gates 17b and 17C of the circuits associated with the other computers.

The $\bar{Q}$ output of the monostable FF 18a drives a block 19a for allowing or inhibiting the arrival of the "ready" signal supplied by a pin 20 of the connector 10 of the reader, at the reception terminal 14a. Block 19a comprises a gate 21a which receives on one input the signal from the $\bar{Q}$ output of the monostable FF, and on the other input the "ready" signal from the reader. The output of the AND gate 21a is transmitted, by an OR gate 22a, to pin 14a.

The second input of gate 22a is connected to the output of a NOR gate 23 whose inputs are connected to the three AND gates 17a, 17b and 17c and whose output forms the "pick command" order applied to the corresponding pin 24 of the connector 10 of the reader.

The device which has just been described operates in the following way. It will be first of all assumed that the reader is free, being connected to none of the computers. The three monostable FF's 18a, 18b and 18c are in the rest position. Their $\bar{Q}$ outputs apply high levels to gates 17.

If we assume that a "pick command" signal requesting access to the reader is applied by the first computer to pins 13a, this signal is transmitted by the enabled gate 17a and by the OR gate 23 to the access request pin 24 of the reader. This change of state of the output of gate 23 is reproduced at the input of the OR gates of blocks 19a, 19b and 19c. Since the change of state of the output of gate 17a has set the monostable FF 18a, the Q output of this latter has changed state and enabled the AND gate 21a allowing the "ready" signal supplied by the reader at its output 20 to pass to the OR gate 22a: this latter transfers the "ready" signal to pin 14a allowing the connection to be established.

If, while the connection is being established, another computer requests access to the card reader, the access request is blocked by the corresponding gates 17.

The switching means shown in FIG. 1 may be used such as they are or with limited modifications in very different installations.

Figure 4A:
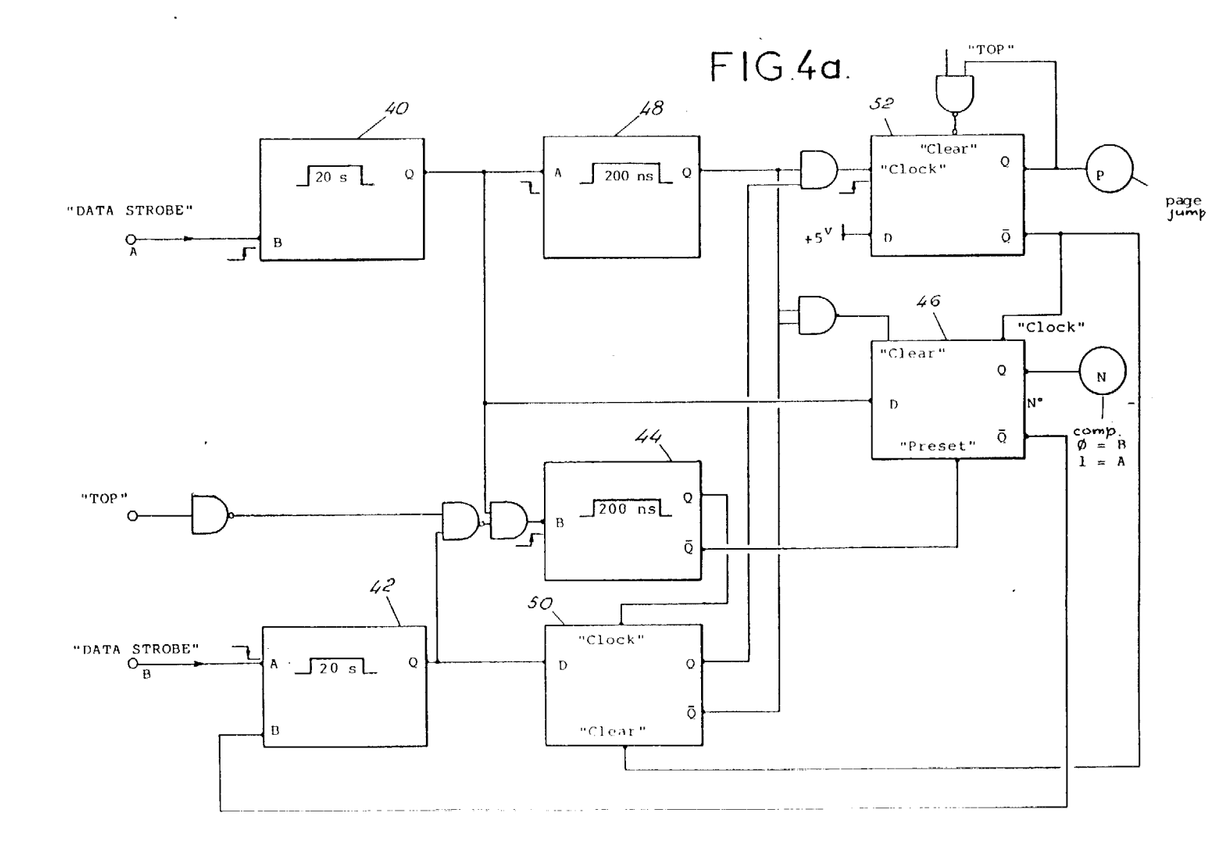
FIGS. 4a and 4b are block diagrams showing the logic and the switching means provided in the installation for allowing access by two computers belonging to the installation to a common output terminal unit, formed by a printer.
Figure 4B:
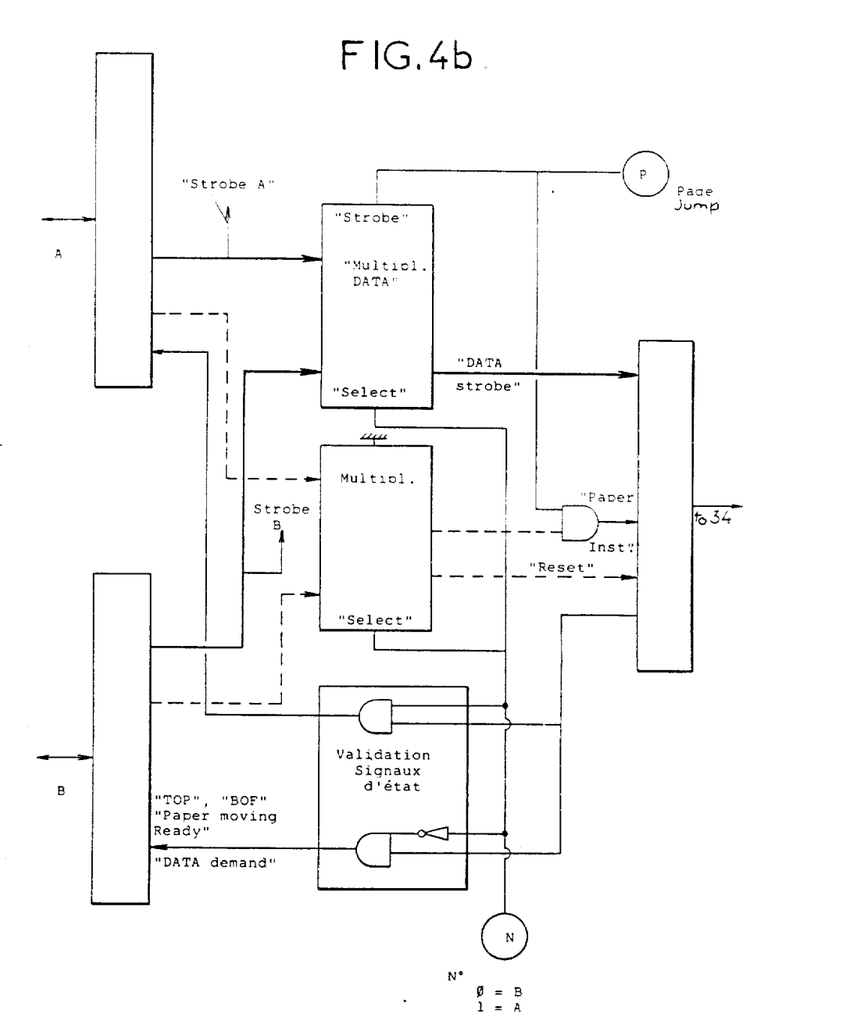

The means shown in FIGS. 4a and 4b are provided for allowing access to a printer by two computers A and B. For the installation given by way of example, nineteen signals are exchanged between the computer interface and printer 34.

ready: indicates that the printer 34 is ready to be placed on line by the operator.

on line: the printer is connected for automatic operation data demand: data transmission signal.
data strobe: data validation signal.
data 1-7: data signals (code ASCII).
paper instruction: signal for unrolling the paper.
top: top of page position.

The other signals are status data.

In the particular case mentioned, priority is given to computer A. In the case where a permutation is requested by the computer with priority when the printer is occupied, the permutation is only effective on detection of the "top of page" signal. The return to computer B at the end of transfer of A is preceded by a page jump command, so as to separate the information.

If no computer requires the printer, this latter is connected to computer B. Signals P (page jump) and N (selection) are at zero.

1. The arrival of the validation signal from the priority computer (data strobe A) sets monostable 40.

a. if output Q of monostable 42 is at zero (which indicates that the printer is free), monostable 44 is set to 1 and forces flip flop 46 to 1, causing immediate connection to computer A;

b. if monostable 42 is at 1 (which indicates that printer 34 is occupied by computer B) monostable 44 will only be switched on detection of the top signal (top of page). The switching of 44 stores the state of 42 and causes flip flop 46 to be set which ensures switching.

2. When computer A has finished its transfers and after a time delay has expired, monostable 40 is reset to zero; monostable 48 passes to 1. It follows that:

a. if flip flop 50 is at zero (which indicates that computer B was not using the printer), flip flop 46 is forced to zero: the printer is immediately switched to computer B.

b. If flip flop 50 is at 1 (which indicates that computer B was using the printer), flip flop 52 is set and forces a page jump (generation of the "paper instruction" signal with resetting of data 1-7). On the appearance of the top signal (top of page), flip flop 52 is reset, causing 50 then 46 to be reset. The printer is then switched to computer B.

Figure 5:
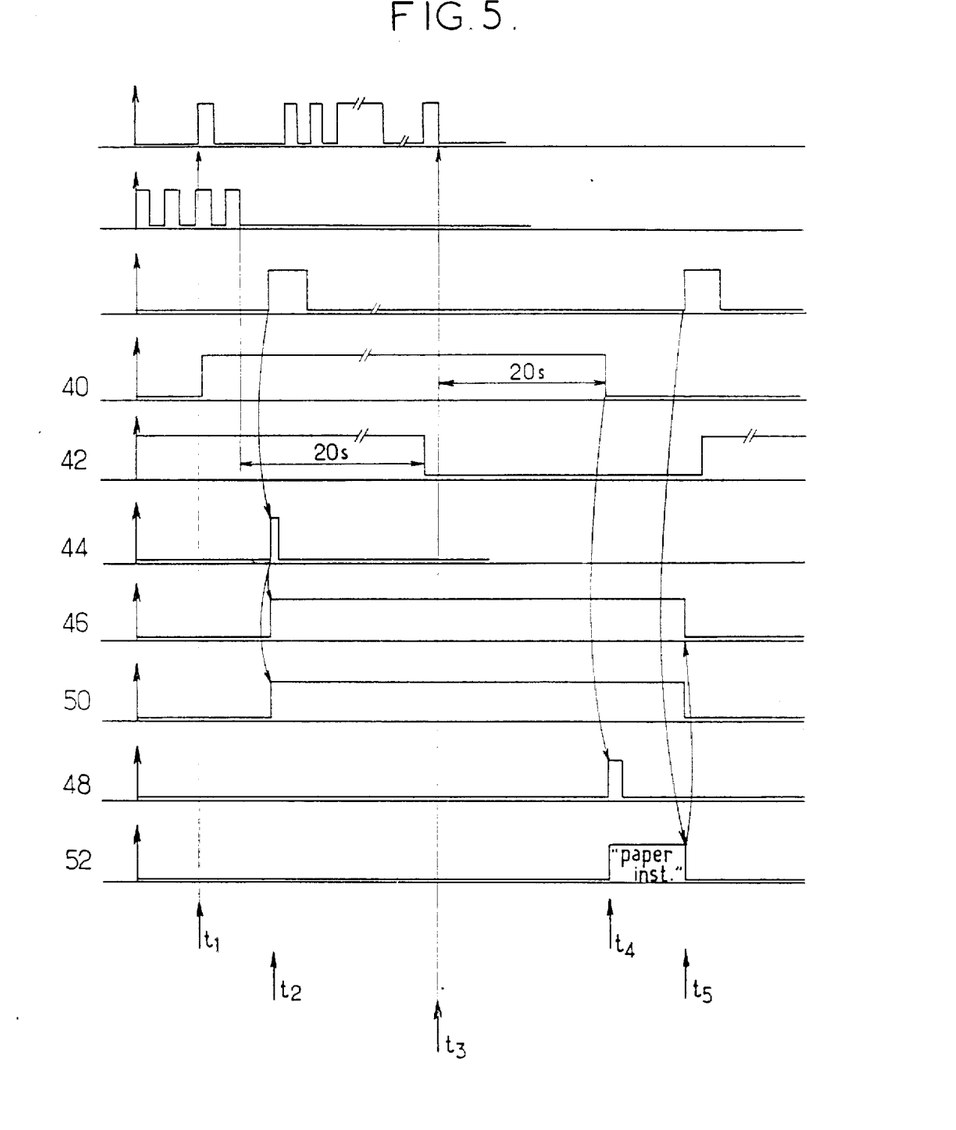
FIG. 5 is a timing diagram of the signals exchanged between computers and printer, the different lines showing the shape of the signals which appear at the points of FIGS. 4a and 4b bearing the same designation.

The timing diagram of FIG. 5 shows, by way of example, the spacing out of the signals following a request for switching printer 34 to computer A, at time T1 when the monostable 42 is in the high state (case 1b above). Switching to computer A then occurs only in response to the detection of the top signal at time T2. The retriggerable monostable 40 remains set for a given time (20 seconds for example) after time T3 at the end of transfer from computer A. The resetting of monostable 40 causes monostable 48 to be set, for a very short time with respect to that of 40 (200 ns instead of 20 seconds for example) and the emission of a "paper instruction" page jump at time T4. Then, on the appearance of the top signal, at time T5 the printer is again connected to computer B and the "paper instruction" signal ends.

Figure 2:
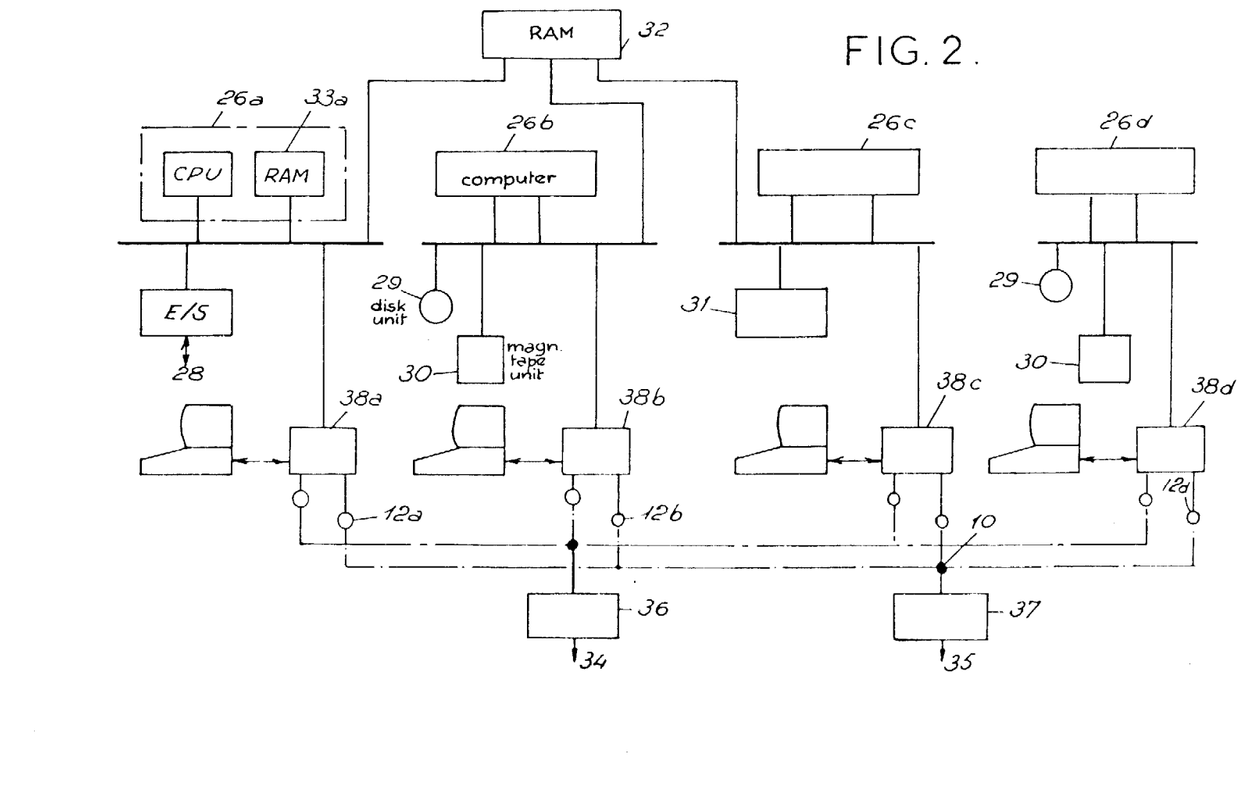
FIG. 2 is a block diagram showing an installation with four computers and two standardized terminal units.

FIG. 2, shows in another embodiment, an installation comprising a computing center with three computers 26a, 26b and 26c working in parallel and a stand-by computer 26d. The computing center may for example form a simulator for simulating the behavior of a pressurized water power reactor. The computing center may then provide:

execution of the simulation calculations:
checking and control of the simulated procedure,
checking and control of the terminal units,
execution of the maintenance programs,
execution of the soft ware development assistance programs.

For that, the computing center comprises numerous industrial inputs/outputs 28 to the control room, high capacity stores (with hard disk 29 and magnetic tapes 30 for example), a character generator 31, etc. . . . as well as a RAM 32 accessible by all the computers and in addition to the individual stores such as 33a of the CPU's.

Two terminal units of the installation are little used namely printer 34 and card reader 35. Though they are in fact indispensable for initialization and the daily start up of the simulator, the rest of the time they are scarcely used except on the subsidiary computing center using computer 26d and during maintenance work.

The use of a single reader 35 and a single printer 34 instead of four provides a considerable saving.

More precisely, the card reader 35 is used during the initialization, start up and maintenance phases of computers 26a-c and on the subsidiary computing center 26d for the soft ware development. No priority has been defined: the switching is made automatically to the computer which requests it. An system indicating that the cord reader is busy prevents any further switching as long as the card reader is occupied.

On the other hand, printer 34 is normally connected to the computer 26a of the simulator so as to allow real time printing of the messages from the monitor which is not capable of editing its messages a posteriori. But the printer is used especially as output terminal unit for the subsidiary computing center, for batch work on the simulator and for maintenance operations.

The standardization of the card reader 35 and printer 34 is effected by assigning to each switching means 36 or 37 of the kind shown in FIG. 1, connected to couplers 38a–38d of the computers, each connected to a control terminal 39.

The signals exchanged between the computer requesting access and the standardized terminal unit depend on the nature of the hardware. In a representative installation, whose computers are SEL 32/77 and the reader a commercially available model, the connection between the card reader 35 and the coupler 38a/d of a computer is provided by nineteen signals, eighteen of which are sent by the reader to the coupler.

These signals and their identification on the hardware are:

12 data signals (data 1 to data 12),
1 error signal (ERROR)
1 hopper check signal (HOPPER CHECK)
1 busy signal (BUSY)
1 data validity signal (INDEX MARKS),
1 movement check (MOVER CHECK),
1 "ready" signal (READY).

Coupler 38a–d only sends a single signal to the reader 35, the reading request signal (pick command).

When a computer, 38a for example, emits a request for reading the cards, two cases may occur:

1. The reader is busy; the computer then finds that the reader is in "No Ready" condition. The reading request signal (pick command) is blocked.

2. The computer finds that the reader is in "Ready" condition. The switch 10 then signals to the other three computers that the reader is "No ready" ("ready" signal at ∅). Moreover, so as to avoid any conflict between computers and reader, the modified "ready" signal is stored for a time T.

To sum up, only the "ready" signal is modified from the "pick command" signals coming from the different computers. The "pick command" signal is not modified if the computer is exchanging data with the reader; on the other hand, this signal is not transmitted if the reader is already connected to another computer or if period T is not finished.

All the other signals are transmitted without any alteration, generally through buffer circuits.

Figure 3:
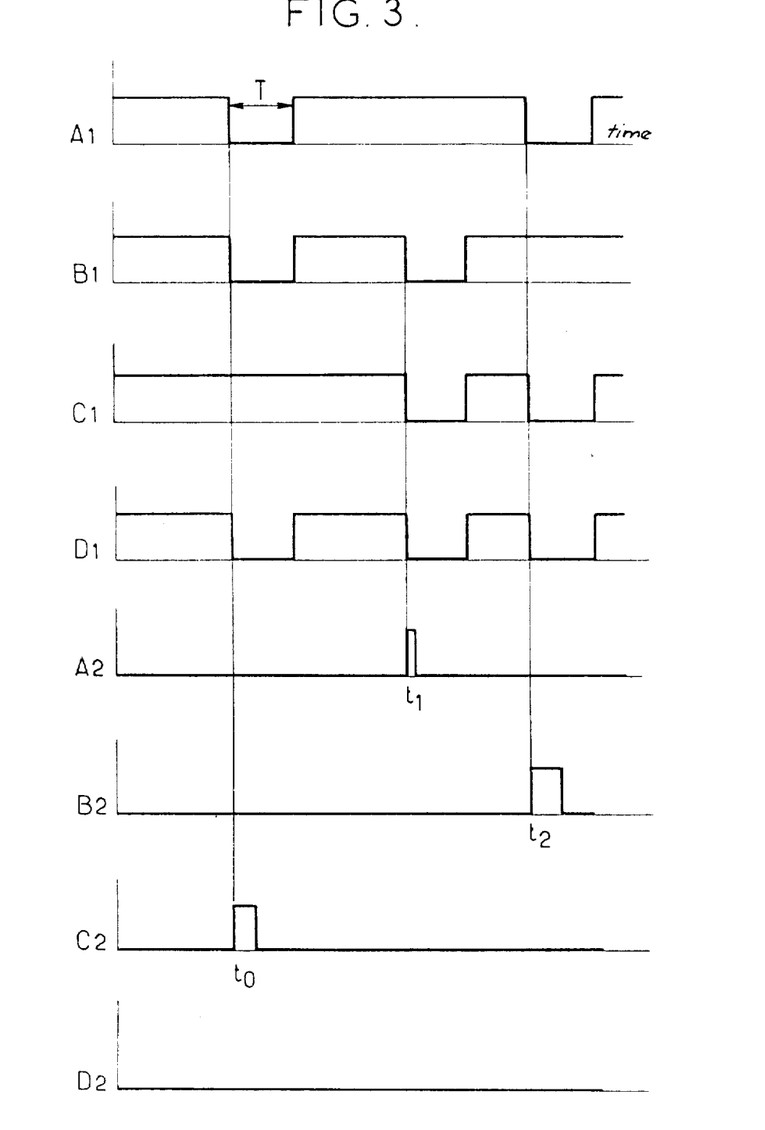
FIG. 3 is a timing diagram of the signals exchanged in the installation during establishment of the dialogue between the computers and the card reader.

The timing diagram of FIG. 3 shows possible staggering of use of the card reader by the three computers. Lines $A_1$, $B_1$, $C_1$, and $D_1$ give the logic level of the "ready" signal arriving at the couplers of the computers; lines $A_2$, $B_2$, $C_2$, and $D_2$ give the "pick command" signals emitted by these couplers.

It can be seen that at times $t_0$, $t_1$, $t_2$ the "ready" signals are at 1 and that computers 26c, 26a and 26b obtain immediate access while causing the "ready" signal to pass to zero for the other three computers, which prevents them dialoguing with the reader until time T has expired.

In practice, the gates and timing monostables may be formed with TTL logic and the switch may be fitted in a computer cabinet. The power supply may be provided from the reader so as to avoid having to switch on the computer when it is desired to connect the reader to the other computers. The connections may be formed by conventional flat connectors.

The installation could comprise a number of computers different from four and the standardized terminal units could be increased in number and comprise for example a magnetic tape unit.

We claim:

1. A computer system comprising:

two digital computers each having means for sending an access request to a terminal unit from an output terminal when required for operation of the computer and having a receipt terminal for reception by said computer of a "ready" signal from the terminal unit indicating that access to said terminal unit is granted;

at least one terminal unit suitable for operation in co-operation with any one of said digital computers;

and connection means responsive to an access request from any one of said computers for providing a connection between said computer which sent the access request and said terminal unit while preventing access to said terminal unit by the other computers and providing an access priority to a first one of said computers with respect to the other computer;

said connecting means including: a switching circuit having a first condition providing connection of the first computer to said terminal unit and a second condition providing connection of the second computer to said terminal unit, said switching circuit being arranged to remain in the second condition until it receives an access request from said first computer and including a first circuit and a second circuit, said first and second circuits being respectively connected to said first and second computers so as to receive respective access requests therefrom so that each of said first and second circuits is responsive to access requests by the respective computer connected thereto, said switching circuit further comprising switching means including inputs connected to said first and second circuits for receiving control signals therefrom, and being arranged for overriding the control signal from said first circuit and for switching said switching circuit to said first condition responsive to the occurrence of a signal representing a predetermined condition of said terminal unit delivered by said terminal unit and an access request directed to said first circuit by said first computer.

2. A computer system comprising:

a printer for delivering page top signals;

two digital computers only, each computer including means for sending an access request to said printer from an output terminal when required for operation of the computer and having a receipt terminal for reception by said computer of a "ready" signal from the printer indicating that access to said printer is granted;

and connecting means responsive to an access request from either of said two computers for providing a connection between the computer which sent the access request and said printer while preventing access to said printer by the other computer and for providing access priority to a first one of said computers with respect to the second one of said computers;

said connecting means including: a switching circuit having a first condition which provides connection of the first computer to said printer and a second condition which provides connection of the second computer to said printer, said switching circuit being arranged to remain in the second condition until said switching circuit receives an access request from said first computer and further including a first circuit and second circuit, said first and second circuits being connected to said first and second computers, respectively, to receive access requests therefrom and each of said first and second circuits being responsive to access requests by a respective one of said first and second computers, said switching circuit further comprising switching means including inputs connected to said first and second circuits for receiving control signals thereof, and being arranged for overriding control signals from said first circuit and for switching said switching circuit to said first condition responsive to the simultaneous occurrence of one said page top signal delivered by said printer and of an access request directed to said first circuit by said first computer.

* * * * *